(12) United States Patent
DeBellis et al.

(10) Patent No.: US 8,230,356 B2
(45) Date of Patent: Jul. 24, 2012

(54) APPARATUS, SYSTEM, AND METHOD FOR CONCURRENT WINDOW SELECTION

(75) Inventors: Craig Michael DeBellis, Apex, NC (US); William Gabriel Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1976 days.

(21) Appl. No.: 10/846,882

(22) Filed: May 14, 2004

(65) Prior Publication Data

US 2005/0257160 A1    Nov. 17, 2005

(51) Int. Cl.
*G06F 3/048* (2006.01)
*G06F 3/00* (2006.01)

(52) U.S. Cl. ........ 715/771; 715/788; 715/789; 715/790; 715/794; 715/797

(58) Field of Classification Search .......... 715/788–801, 715/738
See application file for complete search history.

(56) References Cited

U.S. PATENT DOCUMENTS

| | | | | |
|---|---|---|---|---|
| 4,833,596 A * | 5/1989 | Buckland et al. | ............... | 710/14 |
| 4,975,690 A | 12/1990 | Torres | ............... | 340/721 |
| 5,113,517 A * | 5/1992 | Beard et al. | ............... | 703/23 |
| 5,226,117 A | 7/1993 | Miklos | ............... | 395/157 |
| 5,408,602 A * | 4/1995 | Giokas et al. | ............... | 715/733 |
| 5,491,795 A | 2/1996 | Beaudet et al. | | |
| 5,694,561 A | 12/1997 | Malamud et al. | ............. | 395/346 |
| 5,742,778 A | 4/1998 | Hao et al. | ............. | 395/332 |
| 5,867,160 A * | 2/1999 | Kraft et al. | ............. | 715/803 |
| 5,884,553 A | 3/1999 | Morris | ............. | 99/337 |
| 5,892,511 A * | 4/1999 | Gelsinger et al. | ............. | 715/794 |
| 5,995,103 A | 11/1999 | Ashe | ............. | 345/346 |
| 6,108,714 A | 8/2000 | Kumagai et al. | ............. | 709/310 |
| 6,323,811 B1 * | 11/2001 | Tsubaki et al. | ........ | 343/700 MS |
| 6,411,988 B1 * | 6/2002 | Tafoya et al. | ............. | 709/204 |
| 6,539,421 B1 * | 3/2003 | Appelman et al. | ............. | 709/206 |
| 6,570,590 B1 | 5/2003 | Dubrow et al. | ............. | 345/751 |
| 7,100,116 B1 * | 8/2006 | Shafrir et al. | ............. | 715/751 |
| 7,103,846 B1 * | 9/2006 | Shafrir et al. | ............. | 715/751 |
| 7,124,164 B1 * | 10/2006 | Chemtob | ............. | 709/204 |
| 7,143,356 B1 * | 11/2006 | Shafrir et al. | ............. | 715/751 |
| 7,188,317 B1 * | 3/2007 | Hazel | ............. | 715/804 |
| 2002/0083137 A1 * | 6/2002 | Rogers et al. | ............. | 709/205 |
| 2003/0063119 A1 * | 4/2003 | Bloomfield et al. | ............. | 345/738 |
| 2004/0010607 A1 * | 1/2004 | Lee et al. | ............. | 709/229 |
| 2005/0125741 A1 * | 6/2005 | Clow et al. | ............. | 715/794 |

* cited by examiner

*Primary Examiner* — Nicholas Augustine
(74) *Attorney, Agent, or Firm* — Kunzler Needham Massey & Thorpe

(57) ABSTRACT

An apparatus, system and method of concurrent window selection are provided. The invention communicates a directive to a plurality of window modules. Each window module may enter a selected state responsive to receiving a selection directive, enter a deselected state responsive to receiving a deselection directive, and maintain an existing state responsive to receiving a null directive. The state of each window module is independent of and unaffected by the state and the state change of each other window module. The invention further communicates a command to each window module in the selected state.

27 Claims, 4 Drawing Sheets

APPARATUS, SYSTEM, AND METHOD FOR CONCURRENT WINDOW SELECTION

BACKGROUND OF THE INVENTION

1. Field of the Invention

This invention relates to issuing commands to window modules and more particularly relates to concurrently selecting and issuing commands to a plurality of window modules.

2. Description of the Related Art

A graphical user interfaces ("GUI") typically displays window modules that allow a user to view data including text, figures, and images. One or more window modules may be rendered simultaneously. Working with a plurality of window modules is useful for accessing data from multiple sources or observing multiple processes such as the multiple processes of each computer of a server farm.

Unfortunately, while the user can view data in a plurality of window modules concurrently, the user cannot manipulate the plurality of window modules concurrently. GUIs allow only one window module at a time to be selected. Selecting a second window module when a first window module is already selected results in the deselection of the first window module. Thus one command cannot be communicated to the plurality of window modules and one command cannot concurrently manipulate the plurality of window modules.

Methods have been created to place a global cursor in a plurality of window modules for receiving a command and to broadcast a command to a plurality of window modules. Unfortunately, the global cursor and broadcast command methods do not allow the user to manipulate all features of the plurality of window modules including minimizing the plurality of window modules, closing the plurality of window modules, and entering non-text commands to the plurality of window modules. In addition, the global cursor and broadcast commands may not function seamlessly for all window modules that may operate under the GUI.

From the foregoing discussion, it should be apparent that a need exists for a process, apparatus, and system that support concurrent selection of a plurality of window modules. Beneficially, such a process, apparatus, and system would allow a user to manipulate and direct commands to the plurality of window modules.

SUMMARY OF THE INVENTION

The present invention has been developed in response to the present state of the art, and in particular, in response to the problems and needs in the art that have not yet been fully solved by currently available window modules. Accordingly, the present invention has been developed to provide a method, apparatus, and system for concurrent window selection that overcome many or all of the above-discussed shortcomings in the art.

The apparatus for concurrent selection is provided with a logic unit containing a plurality of modules configured to functionally execute the necessary steps of concurrent selection. These modules in the described embodiments include a plurality of window modules and at least one listener module.

Each of the plurality of window modules enters a state responsive to a directive. In one embodiment, the window module enters a selected state in response to receiving a selection directive. The window module may also enter a deselected state responsive to a deselection directive. In addition, the window module maintains an existing state responsive to a null directive. The state of each window module is independent of and unaffected by the state and the change of state of each other window module. For example, if a first window module is in the selected state and a second window module enters the selected state, the first window module may receive a null directive and maintain the selected state.

The at least one listener module is in communication with at least one window module. In one embodiment, the at least one listener module is in communication with each window module. In an alternate embodiment, a plurality of listener modules is each in communication with a window module of the plurality of window modules. The listener module receives a command and communicates the command to each window module if the window module is in the selected state.

The apparatus is further configured, in one embodiment, with at least one stroke module. The stroke module receives a stroke. The stroke may include one or more keystrokes on one or more keyboard keys. The stroke may also include a pointing device stroke such as a Mouse Click or a touch screen selection. The stroke may be a selection stroke. The selection stroke is a stroke that selects or deselects one or more window modules. For example, a TAB key keystroke may select a second window module and deselect a first window module. In an alternate example, a left Mouse Click with the mouse pointer positioned on a window module may select the window module.

The stroke module directs the selection directive, the deselection directive, and the null directive to each window module in response to the selection stroke. In one embodiment, the stroke module receives a multi-selection stroke. The multi-selection stroke may be a plurality of input strokes. In a certain embodiment, the stroke module directs the selection directive to the first window module and a null selection directive to at least one second window module responsive to the multi-selection stroke.

The stroke module may also receive a uni-selection stroke and direct the selection directive to the first window and the deselection directive to the at least one second window. In one embodiment, each window module in the selected state may execute the command received from the listener module. For example, if the first and the second window module are in the selected state and receive a close command directing each selected window module to close, both the first and the second window module will close in response to the command.

A system for concurrent selection is also presented. The system may be embodied in a computer system. In particular, the system, in one embodiment, includes a processor module, an input module, and a display module.

The processor module executes a plurality of window modules. The display module renders each window module. Each window module has a state and enters a selected state responsive to receiving a selection directive, a deselected state responsive to receiving a deselection directive, and maintains an existing state responsive to receiving a null directive. The state of each window module is independent of and unaffected by each other window module. The processor module receives a command from the input module and communicates the command to each window module if the window module is in the selected state. In one embodiment, the system includes a stroke module. The stroke module may receive a selection stroke from the input module and direct the selection directive, the deselection directive, and a null selection directive to each window module responsive to the selection stroke.

A method of the present invention is also presented for concurrent selection. The method in the disclosed embodiments substantially includes the steps necessary to carry out the functions presented above with respect to the operation of the described apparatus and system. In one embodiment, the method includes communicating a directive to a plurality of window modules, inputting a command, and communicating the command. The method also may include receiving a selection stroke.

The method communicates a directive to a plurality of window modules. Each window module has a state that is independent of and unaffected by the state and the change of state of each other window module. Each window enters or maintains a state in response to the directive. The method inputs a command and communicates the command to each window module in the selected state. In one embodiment, the process receives a selection stroke. The stroke selection may be a multi-selection stroke. In addition, the stroke selection may be a uni-selection stroke. The method directs the directive to the plurality of window modules in response to the selection stroke.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention allows the concurrent selection of a plurality of window modules to a selected state. In addition, the present invention communicates a command to each of the plurality of windows in the selected state. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
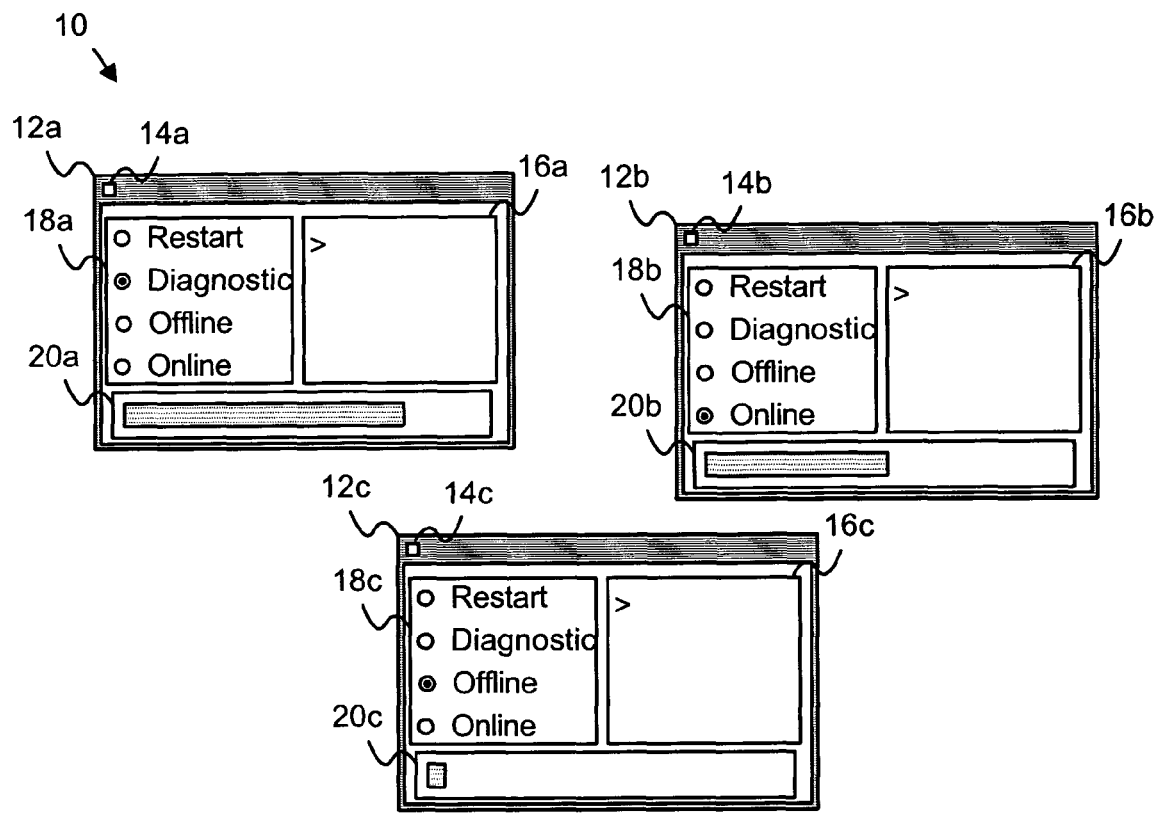
FIG. 1 is a drawing illustrating one embodiment of rendered windows modules in accordance with the present invention.

Referring to FIG. 1, one embodiment of rendered window modules 10 of the present invention is illustrated. Each window module 12 is rendered as an interface to a computer process. The window module 12 may include a window control 14. The window control 14 performs one or more window functions including but not limited to closing the window module 12, minimizing the window module 12, and resizing the window module 12.

The window module 12 also includes a command line box 16. The command line box 16 may receive typed commands. The window module 12 may also include a graphical command box 18 that receives commands from a pointing device (not shown) such as a computer mouse. In addition, the window module 12 may include a display box 20. In one embodiment, the display box 20 renders text. The display box 20 may also render graphics and text. Although each window module 12 is illustrated with one window control 14, one command line box 16, one graphical command box 18, and one display box 20, each window module may contain any number of window controls 14, command line boxes 16, graphical command boxes 18, and display boxes 20.

A first window module 12a may be selected by a stroke such as a selection stroke. The term "stroke" as used herein is intended to refer to input commands or data to a computer or data processing device and may also be referred to as an input stroke. The stroke may include one or more keystrokes on one or more keyboard keys. Some keystrokes may be text input strokes and input a character to the computer. The stroke may also include a pointing device stroke such as a depressing a mouse button ("Mouse Click") or a touch screen selection. For example, a left Mouse Click, depressing the left mouse button, with the mouse pointer positioned over a command box of a graphical user interface ("GUI") may input a specified command to the computer.

The stroke may be a selection stroke. The selection stroke is a stroke that selects or deselects one or more window modules 12. In one embodiment, the selection stroke is made by a keyboard keystroke. For example, a TAB key keystroke may select the second window module 12b and deselect the first window module 12a. In an alternate embodiment, the selection stroke is made by a pointing device. For example, a left Mouse Click with the mouse pointer positioned on a window module 12 may select the window module 12. In a certain embodiment, the selection stroke is a combination of one or more keystrokes and one or more pointing device strokes. For example, depressing the SHIFT key and a left Mouse Click with the mouse pointer positioned over the first window module 12a may select the first window module 12a. Other types of input commands may also be used as strokes and selection strokes.

The first window module 12a enters a selected state in response to the selection stroke such the left Mouse Click. In a certain embodiment, the appearance of the first window module 12a modifies to indicate the selected state. In addition, a second window module 12b may be selected by the selection stroke and enter the selected state. In one embodiment, the second window module 12b is selected by a multi-selection stroke. A user may direct a command to the first window module 12a and the second window module 12b in the selected state. The command may be a text input stroke from a keyboard. In addition, the command may be a pointing input stroke from the pointing device. In a certain embodiment, the command is a window module management command. The window module management command may direct the window module 12 to execute functions including but not limited to closing, resizing, minimizing, and expanding. The first window module 12a and the second window module 12b both receive and execute the command. For example, the first window module 12a and the second window module 12b in the selected state may each receive the window module management command to close, and both the first window module 12a and the second window module 12b will close in response to the single window module management command.

The rendered window modules 10 illustrates two or more concurrently selected window modules 12. In addition, the present invention allows the two or more concurrently selected window modules 12 to concurrently receive the command. The command may be a text input, a pointing input, and a window module management function.

Figure 2:
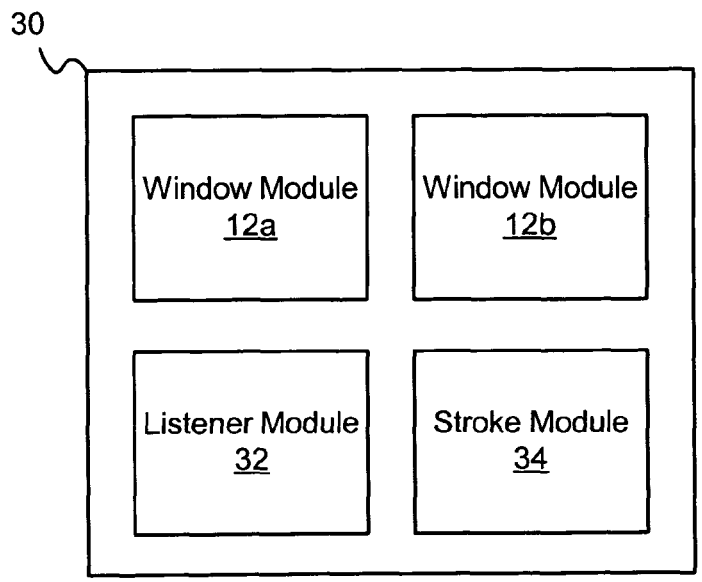
FIG. 2 is a block diagram illustrating one embodiment of a concurrent selection apparatus of the present invention.

FIG. 2 is a block diagram illustrating one embodiment of a concurrent selection apparatus 30 of the present invention. The concurrent selection apparatus 30 supports the concurrent selection a plurality of window modules 12 so that each window module 12 concurrently receives a command. The concurrent selection apparatus 30 includes a plurality of window modules 12, and a listener module 32. In one embodiment, the concurrent selection apparatus 30 is further configured with a stroke module 34. Although the concurrent selection apparatus 30 is depicted with two window modules 12, one listener module 32, and one stroke module 34, the concurrent selection apparatus 30 may include any number of window modules 12, listener modules 32, and stroke modules 34. The concurrent selection apparatus 30 may be included in a computer or data processing device.

Each of the plurality of window modules 12 is programmed to enter a state responsive to a directive. In one embodiment, the window module 12 enters a selected state in response to receiving a selection directive. The window module 12 may also enter a deselected state responsive to a deselection directive. In addition, the window module 12 maintains an existing state responsive to a null directive. For example, when the first window module 12a is in the selected state and receives the null directive, the first window module 12a maintains the selected state. In one embodiment, the null directive is the absence of a directive. The state of each window module 12 is independent of and unaffected by the state and the change of state of each other window module 12. For example, if the first window module 12a is in the selected state and the second window module 12b enters the selected state in response to receiving the selection directive, the first window module may also maintain the selected state.

The listener module 32 is in communication with each window module 12. In one embodiment, one listener module 32 is in communication with each window module 12. In an alternate embodiment, a plurality of listener modules 32 is each in communication with one window module 12 of the plurality of window modules 12. In a certain embodiment, the listener module 32 is a software process executing under an operating system. The listener module 32 may be an interrupt driven process. In addition, the listener module 32 may monitor or listen to one or more communication ports with the computer. For example, the computer may be in communication with a mouse through logical port 'A'. The listener module 32 may monitor logical port 'A', intercepting one or more commands transmitted through logical port 'A'.

The listener module 32 receives a command and communicates the command to the window module 12 if the window module 12 is in the selected state. If the window module 12 is in the deselected state, the listener module 32 does not communicate the command to the window module 12.

The concurrent selection apparatus 30 is further configured, in one embodiment, with at least one stroke module 34. The stroke module 34 may receive the selection stroke and direct the selection directive, the deselection directive, and the null directive to each window module 12 in response to the selection stroke. In one embodiment, the stroke module 34 receives the multi-selection stroke. The multi-selection stroke may be a plurality of input strokes. In a certain embodiment, the stroke module 34 directs the selection directive to the first window module 12*a* and the null selection directive to at least one second window module 12*b* in response to the multi-selection stroke. The stroke module 34 may also receive a uni-selection stroke and direct the selection directive to the first window 12*a* and the deselection directive to the at least one second window 12*b* in response to the uni-selection stroke.

In one embodiment, each window module 12 in the selected state may execute the command from the listener module 32. For example, if the first window module 12*a* and the second window module 12*b* are in the selected state and receive a close command directing each selected window module 12 to close, both the first window module 12*a* and the second window module 12*b* will close in response to the close command. The concurrent selection apparatus 30 allows the concurrent selection of the plurality of window modules 12 into the selected state and the concurrent communication of the command to each of the plurality of window modules 12 in the selected state.

Figure 3:
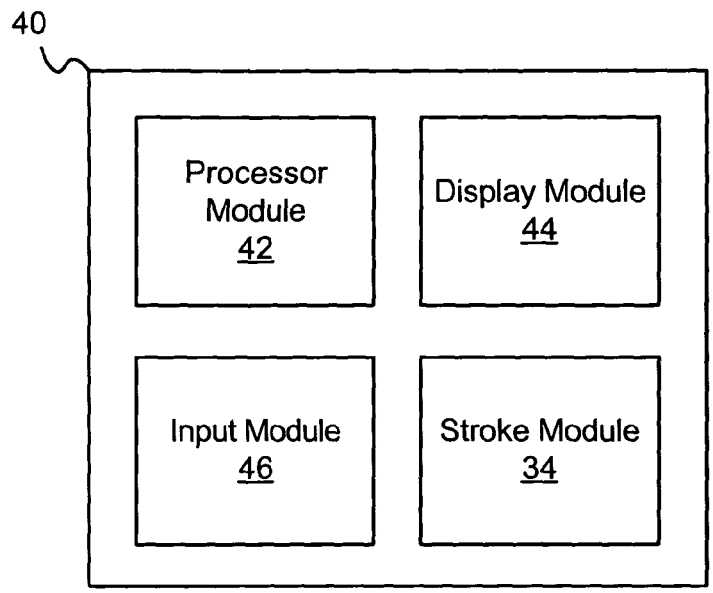
FIG. 3 is a block diagram illustrating one embodiment of a concurrent selection system in accordance with the present invention.

Referring to FIG. 3, a block diagram illustrating one embodiment of a concurrent selection system 40 in accordance with the present invention is depicted. The concurrent selection system 40 includes a processor module 42, a display module 44, and an input module 46. In one embodiment, the concurrent selection system 40 also includes a stroke module 34. The depicted system 40 may be embodied in a computer system. For example, the processor module 42 may include the processor, memory, and communication modules of a computer. The input module 46 may include a keyboard and a pointing device such as a mouse. In addition, the display module 44 may include a monitor and a graphics module.

In one embodiment, the processor module 42 executes the modules of the concurrent selection apparatus 30 of FIG. 2 including the window modules 12. The display module 44 renders each window module 12. For example, the display module 44 may render the window modules 12 on the monitor. Each window module 12 has a state and enters the selected state responsive to receiving the selection directive, the deselected state responsive to receiving the deselection directive, and maintains an existing state responsive to receiving the null directive. The state of each window module 12 is independent of and unaffected by the state and the change of state of each other window module 12. The processor module 42 receives a command from the input module 46 and communicates the command to each window module 12 if the window module 12 is in the selected state.

In a certain embodiment, the concurrent selection system 40 includes the stroke module 34. The stroke module 34 may execute on the processor module 42 as a software process under an operating system. The stroke module 34 may include the listener module 32 of FIG. 2. In one embodiment, the stroke module 34 monitors one or more logical ports of the computer, such as a logical port used by the input module 46 to communicate with the processor module 42. The stroke module 34 may receive a selection stroke from the input module 46. For example, the stroke module 34 may receive a left Mouse Click with the mouse pointer positioned over the first window module 12*a*. The stroke module 34 may direct the selection directive, the deselection directive, and a null selection directive to each window module 12 in response to the selection stroke. For example, the stroke module 34 may direct the selection directive to the first window module 12*a* and the deselection directive to the second and third window modules 12*b*, 12*c* in response to a left Mouse Click with the mouse pointer positioned over the first window module 12*a*.

In one example of the present invention, the stroke module 34 receives a multi-selection stroke from the input module 46. The multi-selection stroke may be a left Mouse Click with the mouse pointer positioned over the first window module 12*a* and the concurrent depressing of the control ("CTRL") key. The stroke module 34 directs the selection directive to the first window module 12*a* and the null selection directive to the second and third window modules 12*b*, 12*c* responsive to receiving the multi-selection stroke. Thus the first window module 12*a* would enter the selected state responsive to receiving the selection directive and the second and third window modules 12*b*, 12*c* would maintain an existing state responsive to receiving the null selection directive.

In a certain embodiment, one of the plurality of window modules 12 communicates with one or more computers in communication with a processor module 42. The concurrent selection system 40 may issue a command to the computers through the plurality of window modules 12 in the selected state. The system 40 may be used to concurrently control a plurality of computers in, for example, a server farm. For example, the concurrent selection system 40 may issue a "reboot" command through a plurality of window modules 12 in the selected state, wherein each window module 12 is in communication with a computer server. Each computer server would receive the "reboot" command and reboot responsive to receiving the command. The concurrent selection system 40 allows the user to select a plurality of window modules 12 to enter the selected state and to concurrently communicate one command to each of the window modules 12 in the selected state.

Figure 4:
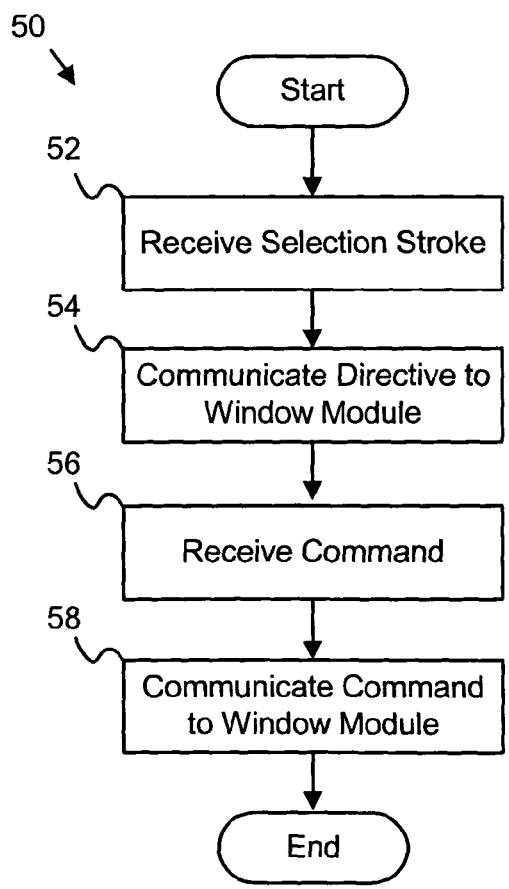
FIG. 4 is a flow chart diagram illustrating one embodiment of a concurrent selection method in accordance with the present invention.

FIG. 4 is a flow chart diagram illustrating one embodiment of a concurrent selection method 50 in accordance with the present invention. Although for purposes of clarity the concurrent selection method 50 is depicted in a certain sequential order, execution may be conducted in parallel and not necessarily in the depicted order.

In one embodiment, the concurrent selection method 50 receives 52 a selection stroke. The selection stroke may be a multi-selection stroke. In addition, the stroke selection may be a uni-selection stroke. In a certain embodiment, selection stroke is a uni-deselection stroke intended to deselect a first window module 12*a* of a plurality of window modules 12 in the selected state. The method 50 communicates 54 one or more directives to the plurality of window modules 12. In a certain embodiment, the method 50 communicates the deselection directive to the first window module 12*a* of a plurality of window modules 12 in the selected state in response to receiving the uni-deselection stroke. In one embodiment, the concurrent selection method 50 communicates 54 the directive in response to the selection stroke.

Each window module 12 has a state that is preferably independent of and unaffected by the state and the change of state of each other window module 12. Each window module 12 further enters and maintains the state in response to the directive. The concurrent selection method 50 receives 56 an input command. In one embodiment, the command is transmitted to the listener module 32. In a certain embodiment, the command is received 56 from the input module 46. The concurrent selection method 50 communicates 58 the command to the window module 12 if the window module 12 is in the selected state. In a certain embodiment, the concurrent selection method 50 communicates the command through the listener module 32. The concurrent selection method 50 communicates 54 directives to select a plurality of window modules 12 and communicates 58 a command to each selected window module 12.

Figure 5:
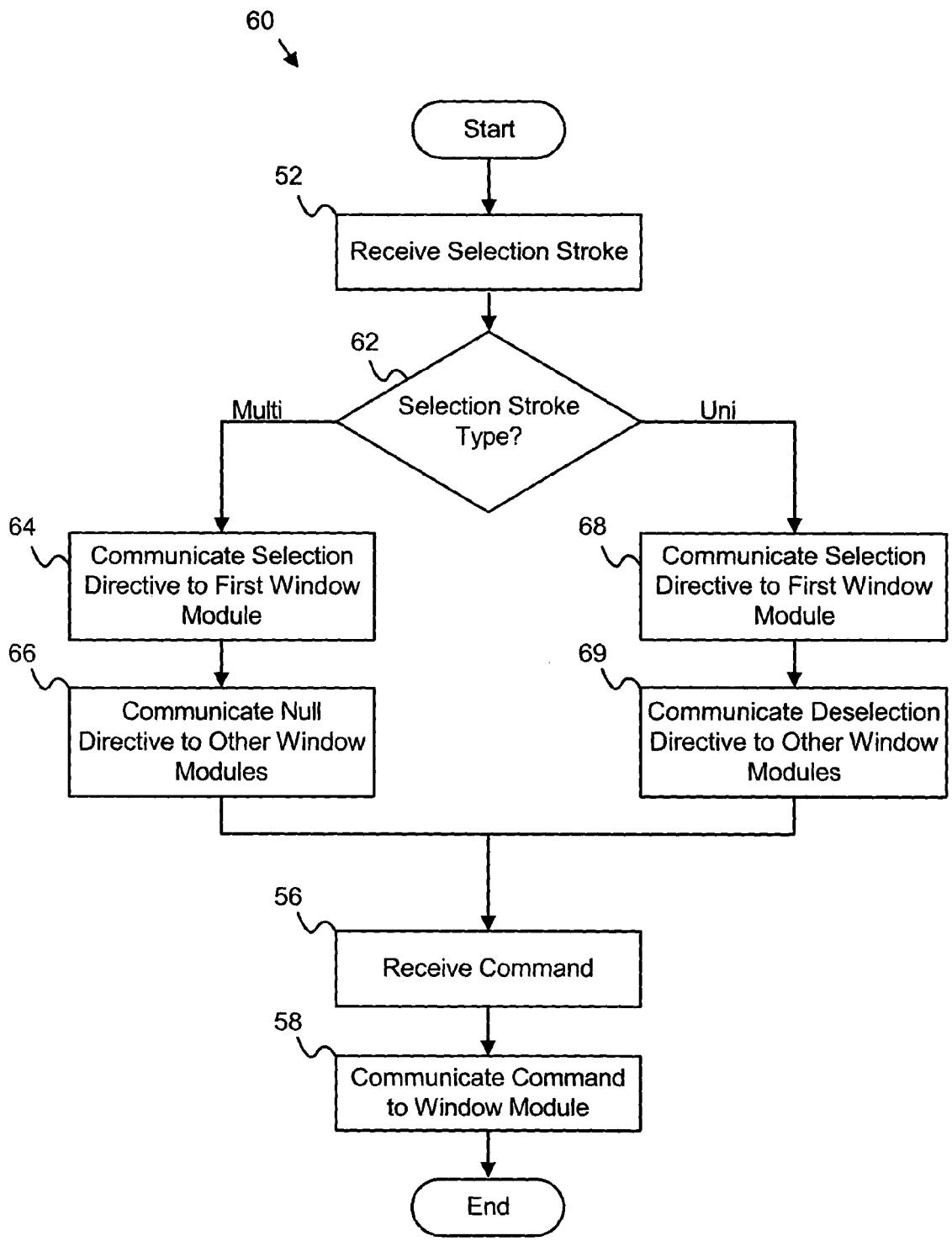
FIG. 5 is a flow chart diagram illustrating one embodiment of a selection method in accordance with the present invention.

FIG. 5 is a flow chart diagram illustrating one embodiment of a selection method 60 of the present invention. Although for purposes of clarity the selection method 60 is depicted in a certain sequential order, execution may be conducted in parallel and not necessarily in the depicted order.

In one embodiment, the selection method 60 receives 52 a selection stroke as described in FIG. 4. The method 60 further determines 62 the type of the selection stroke. If the selection stroke is the multi-selection stroke, the selection method 60 proceeds to communicate 64 the selection directive to the first window module 12a and to communicate 66 the null directive to all other window modules 12. If the selection stroke is the uni-selection stroke, the selection method 60 proceeds to communicate 68 the selection directive to the first window module 12a and to communicate 69 the deselection directive to all other window modules 12. The selection method 60 further receives 56 the command and communicates 58 the command to each window module 12 in the selected state as depicted in FIG. 4.

Figure 6:
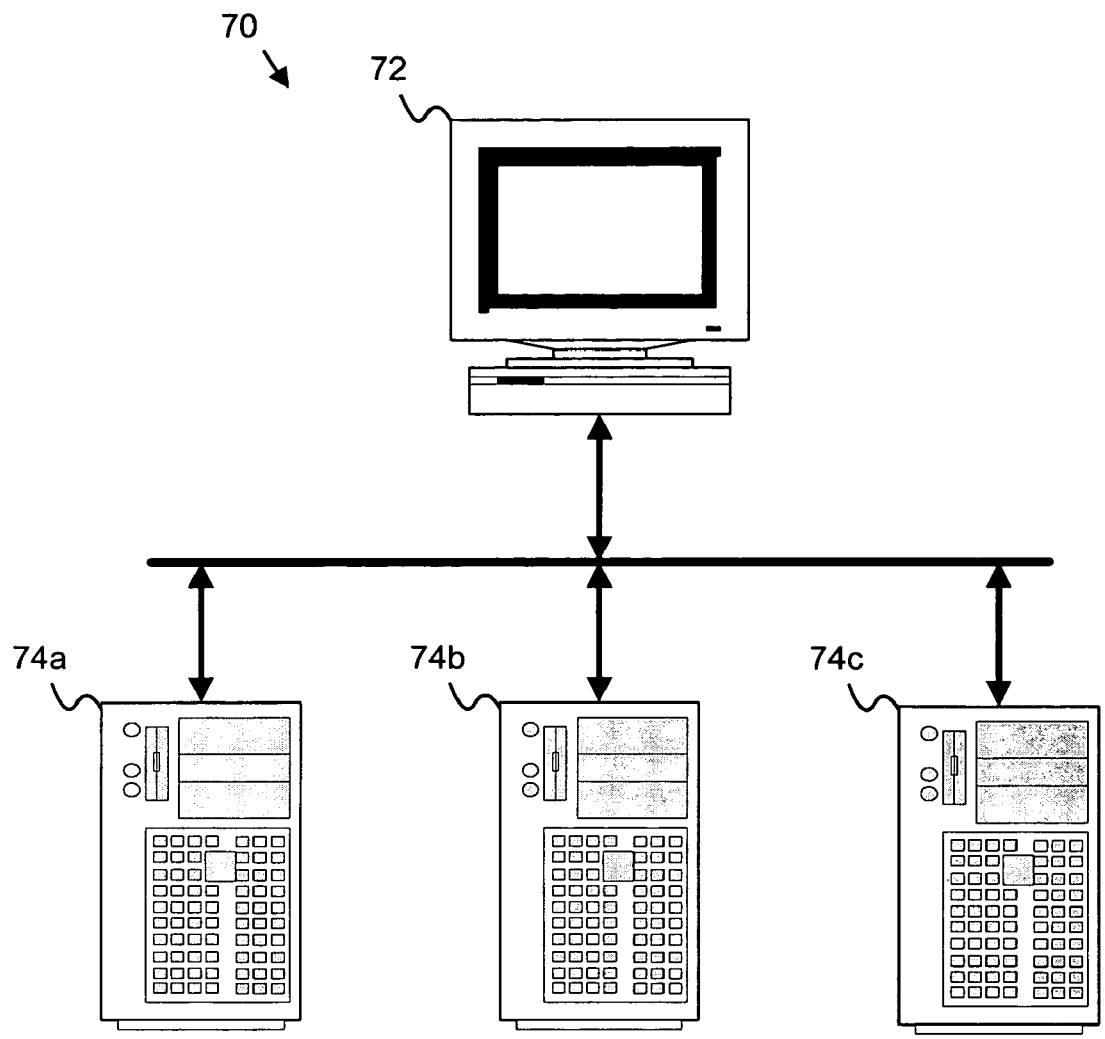
FIG. 6 is a schematic drawing illustrating one embodiment of a concurrent selection control system of the present invention.

FIG. 6 is a schematic drawing illustrating one embodiment of a concurrent selection control system ("CSCS") 70 of the present invention. The CSCS 70 includes a computer 72 and one or more servers 74. The computer 72 may display a window module 12 (of FIG. 1) for each server 74. Each window module 12 is preferably in communication with one of the servers 74. The user may select one or more window modules 12 to the selected state with a multi-selection stroke and communicate a command to each window module 12 in the selected state. Each window module 12 receiving the command communicates the command to the server 74 in communication with the window module 12. Thus, the CSCS 70 allows the user to communicate one command concurrently to one or more servers 70.

The present invention allows the concurrent selection of a plurality of window modules 12 to a selected state. In addition, the present invention communicates a command to each of the plurality of window modules 12 in the selected state. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A concurrent selection apparatus, the apparatus comprising:
at least one stroke module comprising executable code stored on a storage device, executed by a processor and configured to receive a first multi-selection stroke from a user for a first window module of a plurality of window modules and direct a selection directive to the first window module and a null directive to each other window module of the plurality of window modules responsive to the first multi-selection stroke and receive a second multi-selection stroke from the user for a second window module and direct the selection directive to the second window module and the null directive to each other window module responsive to the second multi-selection stroke;
the plurality of window modules each comprising executable code stored on the storage device and executed by the processor and configured to enter a selected state responsive to the selection directive, to enter a deselected state responsive to a deselection directive, and to maintain an existing state responsive to the null directive, wherein the first and second window modules enter the selected state response to the selection directives and each window module in the selected state concurrently receives a user command as though directed to each window module individually and communicates the user command to a server, wherein each window module is in communication with and controls a distinct server; and
at least one listener module comprising executable code stored on the storage device, executed by the processor and in communication with at least one window module of the plurality of window modules and configured to receive the user command and communicate the user command to the server of each window module that is in the selected state.

2. The apparatus of claim 1, wherein the multi-selection stroke is a plurality of input strokes.

3. The apparatus of claim 1, wherein the at least one stroke module receives a uni-selection stroke for the first window module and directs the selection directive to the first window module and the deselection directive to the other window modules responsive to the uni-selection stroke.

4. The apparatus of claim 1, wherein each window module in the selected state receiving the command executes the command.

5. A concurrent selection module, the module comprising executable code stored on a storage device, executed by a processor and:
a stroke module comprising executable code stored on the storage device, executed by the processor and configured to receive first multi-selection stroke from a user for a first window module of a plurality of window modules and direct a selection directive to the first window module and a null directive to each other window module of the plurality of window modules responsive to the first multi-selection stroke and receive a second multi-selection stroke from the user for a second window module and direct the selection directive to the second window module and the null directive to each other window module responsive to the second multi-selection stroke, wherein each window module assumes a selected state responsive receiving the selection directive, a deselected state responsive to receiving a deselection directive, and maintains an existing state responsive to receiving the null directive, the first and second window modules enter the selected state responsive to the selection directives, and each window module comprises executable code stored on the storage device and executed by the processor and each window module in the selected state concurrently receives a user command as though directed to each window module individually and communicates the user command to a server, wherein each window module is in communication with and controls a distinct server; and
at least one listener module comprising executable code stored on the storage device, executed by the processor and in communication with each window module and configured to receive the user command and communicate the user command to the server of each window module if the window module is in the selected state.

6. A concurrent selection system, the system comprising:
a processor module comprising semiconductor logic and configured to execute at least one stroke module comprising executable code stored on a storage device, executed by the processor module, and configured to receive a first multi-selection stroke from a user for a first window module of a plurality of window modules and direct a selection directive to the first window module and a null selection directive to each other window module of the plurality of window modules responsive to the first multi-selection stroke and receive a second multi-selection stroke from the user for a second window module and direct the selection directive to the second window module and the null directive to each other window module responsive to the second multi-selection stroke, and execute the plurality of window modules, each comprising executable code stored on a storage device and configured to enter a selected state responsive to receiving the selection directive, to enter a deselected state responsive to receiving a deselection directive, and to maintain an existing state responsive to receiving the null directive, wherein the first and second window modules enter the selected state responsive to the selection directives and each window module in the selected state concurrently receives a user command as though directed to each window module individually and communicates the user command to a server, wherein each window module is in communication with and controls a distinct, the processor module further configured to receive the user command and communicate the user command to the server of each window module that is in the selected state;

an input module comprising executable code stored on the storage device, executed by the processor module, and configured to communicate the user command to processor module; and a display module comprising executable code stored on the storage device, executed by the processor module, and configured to render each window module.

7. The system of claim 6, wherein the multi-selection directive is a plurality of strokes.

8. The system of claim 6, wherein the stroke module receives a uni-selection stroke for the first window module and directs the selection directive to the first window module and the deselection directive to each other window module responsive to the uni-selection stroke.

9. The system of claim 6, wherein at least one of the plurality of window modules communicates with a separate computer.

10. A computer readable storage medium comprising computer readable code for concurrent selection configured to:

receive a first multi-selection stroke from a user for a first window module of a plurality of window modules and a second multi-selection stroke from the user for a second window module;

communicate a selection directive to the first window module and a null directive to each other window module of the plurality of window modules responsive to the first multi-selection stroke and communicate the selection directive to the second window module and the null directive to each other window module responsive to the second multi-selection stroke, each window module comprising executable code stored on a storage device, executed by a processor and configured to enter a selected state responsive to receiving the selection directive, to enter a deselected state responsive to receiving a deselection directive, and to maintain an existing state responsive to receiving the null directive, wherein the first and second window modules enter the selected state responsive to the selection directives and each window module in the selected state concurrently receives a user command as though directed to each window module individually and communicates the user command to a server, wherein each window module is in communication with and controls a distinct server;

receive the user command; and communicate the user command to the server of each window module that is in the selected state.

11. The computer readable storage medium of claim 10, wherein the multi-selection stroke is a plurality of input strokes.

12. The computer readable storage medium of claim 10, wherein the computer code is further configured to direct a selection directive to the first window module and a deselection directive to each other window module responsive to receiving a uni-selection stroke for the first window module.

13. The computer readable storage medium of claim 10, wherein the computer code is further configured to direct the deselection directive to the first window module of a plurality of window modules in the selected state responsive to receiving a uni-deselection stroke.

14. The computer readable storage medium of claim 10, wherein the command is a window module management command.

15. The computer readable storage medium of claim 10, wherein each window module receiving the command executes the command if the command is a valid command.

16. A method for concurrent selection, the method comprising:

receiving a first multi-selection stroke from a user for a first window module of a plurality of window modules and a second multi-selection stroke from the user for a second window module;

communicating a selection directive to the first window module and a null directive to each other window module of the plurality of window modules responsive to the first multi-selection stroke and communicating the selection directive to the second window module and the null directive to each other window module responsive to the second multi-selection stroke, each window module comprising executable code stored on a storage device and executed by a processor and configured to enter a selected state responsive to receiving the selection directive, to enter a deselected state responsive to receiving a deselection directive, and to maintain an existing state responsive to receiving the null directive, wherein the first and second window modules enter the selected state responsive to the selection directives and each window module in the selected state concurrently receives a user command as though directed to each window module individually and communicates the user command to a server, wherein each window module is in communication with and controls a distinct server;

receiving the user command; and communicating the user command to the server of each window module that is in the selected state.

17. The method of claim 16, wherein the multi-selection directive is a plurality of input strokes.

18. The method of claim 16, further comprising directing the selection directive to the first window module and the deselection directive to each other window module responsive to receiving a uni-selection stroke for the first window module.

19. A concurrent selection apparatus, the apparatus comprising:

means for receiving a first multi-selection stroke from a user for a first window module of a plurality of window modules and a second multi-selection stroke from the user for a second window module, the receiving means comprising executable code stored on a storage device and executed by a processor;

means for communicating a selection directive to the first window module and a null directive to each other window module of the plurality of window modules responsive to the first-multi-selection stroke and communicating the selection directive to the second window module and the null directive to each other window module responsive to the second multi-selection stroke, each window module comprising executable code stored on the storage device and executed by the processor and configured to enter a selected state responsive to receiving the selection directive, to enter a deselected state responsive to receiving a deselection directive, and to maintain an existing state responsive to receiving the null directive, wherein the first and second window modules enter the selected state responsive to the selection directives and each window module in the selected state concurrently receives a user command as though directed to each window module individually and communicates the user command to a server, wherein each window module is in communication with and controls a distinct server, the communicating means comprising executable code stored on the storage device and executed by the processor;

means for receiving the user command, the command receiving means comprising executable code stored on the storage device and executed by the processor; and means for communicating the user command to the server of each of the window modules that is in the selected state, the command communicating means comprising executable code stored on the storage device and executed by the processor.

20. The apparatus of claim 1, wherein the state of each window module is independent of and unaffected by the state and change of state of the other window modules.

21. The apparatus of claim 2, wherein the multi-selection stroke comprises depressing a SHIFT key and a left Mouse Click.

22. The system of claim 6, wherein the state of each window module is independent of and unaffected by the state and change of state of the other window modules.

23. The system of claim 7, wherein the multi-selection stroke comprises depressing a SHIFT key and a left Mouse Click.

24. The computer readable storage medium of claim 10, wherein the state of each window module is independent of and unaffected by the state and change of state of the other window modules.

25. The computer readable storage medium of claim 11, wherein the multi-selection stroke comprises depressing a SHIFT key and a left Mouse Click.

26. The method of claim 16, wherein the state of each window module is independent of and unaffected by the state and change of state of the other window modules.

27. The method of claim 17, wherein the multi-selection stroke comprises depressing a SHIFT key and a left Mouse Click.

* * * * *